United States Patent [19]

Bardin et al.

[11] Patent Number: 4,525,327
[45] Date of Patent: Jun. 25, 1985

[54] LEAD-ANTIMONY-MAGNESIUM ALLOYS FOR STORAGE CELL SUPPORTS AND METHOD OF MANUFACTURING SAID ALLOYS

[75] Inventors: Roland Bardin, Villeurbanne; Joël Mack, Lamure sur Azergues; Jean-Jacques Counioux, Villeurbanne, all of France

[73] Assignee: Compagnie Europeenne d'Accumulateurs, Paris, France

[21] Appl. No.: 456,041

[22] PCT Filed: Jun. 24, 1982

[86] PCT No.: PCT/FR82/00106
§ 371 Date: Dec. 28, 1982
§ 102(e) Date: Dec. 28, 1982

[87] PCT Pub. No.: WO83/00261
PCT Pub. Date: Jan. 20, 1983

[30] Foreign Application Priority Data

Jun. 26, 1981 [FR] France ................................ 81 12603

[51] Int. Cl.$^3$ .......................... C22C 11/10; C22C 1/03
[52] U.S. Cl. .................................... 420/565; 420/569; 420/590; 429/245
[58] Field of Search ............... 420/564, 565, 590, 569; 429/225, 226, 227, 228, 245

[56] References Cited

U.S. PATENT DOCUMENTS

| | | | |
|---|---|---|---|
| 484,084 | 10/1892 | Bottome | 420/565 |
| 2,061,267 | 11/1936 | Downing et al. | 420/564 |
| 3,637,440 | 1/1972 | Foerster et al. | 420/564 |
| 4,159,908 | 7/1979 | Rao et al. | 420/565 |
| 4,253,871 | 3/1981 | Dalibard et al. | 429/245 |

FOREIGN PATENT DOCUMENTS

| | | | |
|---|---|---|---|
| 34277 | 3/1925 | Denmark | 420/564 |
| 2056137 | 5/1971 | France . | |
| 40552 | 12/1924 | Norway | 420/565 |

Primary Examiner—L. Dewayne Rutledge
Assistant Examiner—Robert L. McDowell
Attorney, Agent, or Firm—Kenyon & Kenyon

[57] ABSTRACT

A lead based alloy for electrode supports of a lead-acid storage cell, the alloy containing between 0.05% and 4% antimony between 0.02% and 0.3% magnesium, and no barium. The magnesium permits a reduced antimony content, thereby reducing the corrosion, self-discharge, and hydrogen-releasing overvoltage problems caused by the presence of antimony in electrode supports, without adversely affecting the beneficial mechanical properties provided by antimony. It is essential to have no barium, which causes cracking and high mass corrosion of the alloy during use in a lead-acid cell.

9 Claims, 1 Drawing Figure

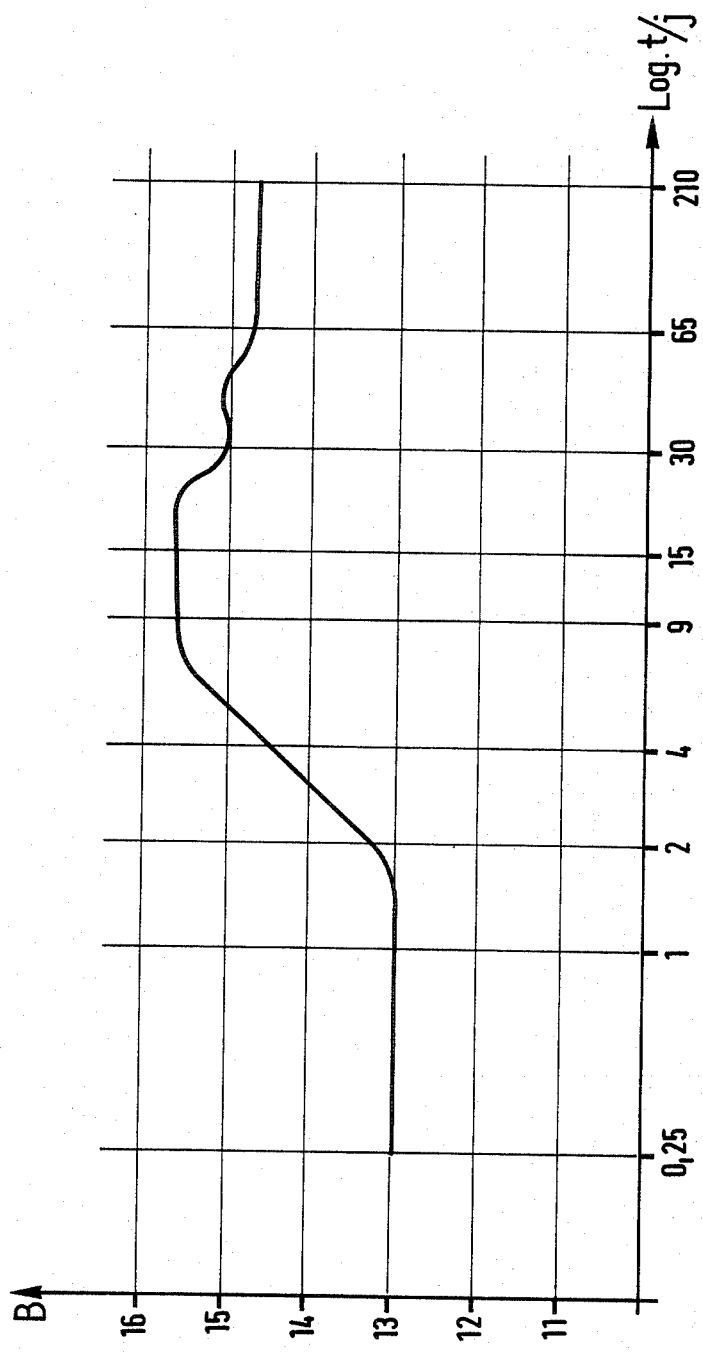

LEAD-ANTIMONY-MAGNESIUM ALLOYS FOR STORAGE CELL SUPPORTS AND METHOD OF MANUFACTURING SAID ALLOYS

The present invention relates to new alloys for manufacturing electrode supports for lead storage cells and more particularly to lead-antimony based alloys containing less than 4% by weight of antimony.

The electrode supports must have good mechanical and chemical characteristics. The addition of antimony imparts very advantageous properties to lead. Besides mechanical characteristics, alloys rich in antimony have good castability. Further, antimony promotes the fixing of the active paste on the supports during cycling.

On the other hand, antimony, which tends to go into solution during the operation of the storage cell, promotes support corrosion and the phenomenon of self-discharge and also reduces the hydrogen-releasing overvoltage.

It is therefore necessary to reduce the antimony content. The addition of a new substance should make it possible to maintain or even to improve the properties of an alloy of reduced antimony content.

The invention provides a lead based alloy containing between 0.05% and 4% antimony and which is intended to be made into lead storage cell electrode supports, characterized in that said alloy contains no barium and contains magnesium, the magnesium content lying between 0.02% and 0.3%.

According to a preferred embodiment of the invention, the alloy contains about 1.8% antimony and 0.15% magnesium.

Additives such as tin, arsenic, copper and sulphur which are generally used in lead-antimony alloys for manufacturing electrode supports and which are designed in particular to improve the castability of these alloys as well as their mechanical strength may also be include in the lead-antimony-magnesium alloy.

Thus, the alloy in accordance with the invention may contain, by weight:

0.05% to 0.3% tin and more especially 0.10% tin in the case where the antimony content is close to 1.8% and the magnesium content is 0.15%;

0.05% to 0.5% arsenic and more especially 0.15% arsenic in the case where the antimony content is close to 1.8% and the magnesium content is 0.15%.

about 0.075% copper;

about 0.006% sulphur;

It is essential for the lead-antimony-magnesium alloy in accordance with the invention, which is intended to produce electrode supports for lead storage cells, to contain no barium. Although the insertion of barium into a ternary lead-antimony-magnesium alloy may increase its resistance to creep, it is observed that such alloys have defects which make them unsuitable for the uses claimed by the Applicant.

Thus, such alloys which contain barium, e.g. those described in French Pat. No. 2 056 237 filed on Feb. 24th, 1970, are difficult to produce because the barium becomes oxidized in the casting bath and are unsuitable since the presence of barium in such alloys gives rise during manufacture to a non-homogeneous structure in the alloy which entails the danger of cracking and during use to high mass corrosion which results in a limited operating life.

More precisely, a lead alloy A in accordance with the invention containing 1.8% antimony and 0.15% magnesium is compared with a lead alloy B containing 1.8% antimony, 0.15% magnesium and 1% barium.

Corrosion measured by potentiometric scanning between 0.6 V and 1.6 V compared with a mercurous sulphate electrode shows that the alloy B is corroded twice as much as the alloy A.

Also, crystallographic examination shows that the alloy B has a rough structure whose grains are of varying sizes, the ratio being 1 to 10 (dimension of the grains 100 to 1000 microns with an average of about 400 microns) while the alloy A has a regular structure which is much finer, the grains having substantially the same dimension, i.e. about 40 microns.

The rough and non-homogeneous structure of the alloy B causes cracking of the electrode supports during manufacture.

Further, during use in sulphuric acid, intergranular corrosion causes cracking which greatly reduces operating life.

In accordance with the invention, because of the difference in density between lead and magnesium and of the danger of forming intermediate compounds of low solubility ($PbMg_2$ and more especially $Mg_3Sb_2$), the alloy is formed in two stages. In the first stage, a mother alloy containing 1% by weight magnesium is constituted in the liquid state by mixing lead-antimony alloy and pure magnesium. The final alloy is obtained in a second stage by melting aliquot quantitites of mother alloy and of lead-antimony alloy.

It has been observed that introducing magnesium into a lead-antimony alloy does not affect the over voltage at which hydrogen is evolved. Also, corrosion of the positive electrode is not increased by the presence of magnesium.

Micrographic analysis shows that the higher the magnesium content, the finer the microstructure of an alloy made in accordance with the invention and annealed at 220° C. The addition of 0.03% by weight Mg reduces the grain size of a $PbSb_{1.8}$ alloy by about 25 times. In the case of an alloy containing 0.15% by weight magnesium, the grain size is reduced by about 500 times, this being particularly advantageous since it is known that the finer the grains, the lower the intergranular corrosion.

The mechanical properties of ternary lead-antimony-magnesium alloys are substantially improved relative to those corresponding to binary lead-antimony alloys. The following table shows, by way of example, the variation of hardness and braking load as a function of composition for some alloys:

| Composition of the alloy (percentage by weight) | | Breaking load (MPa) | Brinell hardness (MPa) | |
|---|---|---|---|---|
| Sb | Mg | (1) | (1) | (2) |
| 0 | 0 | 13.7 | 4 | |
| 1.8 | 0 | 18 | 8.0 | 8.5 |
| 1.8 | 0.01 | 18 | 8.0 | |
| 1.8 | 0.03 | 20 | 9.5 | 10.5 |
| 1.8 | 0.09 | 21.5 | 11.6 | 13.4 |
| 1.8 | 0.15 | 24.3 | 12.8 | 14.5 |
| 0.05 | 0.1 | | 17.2 | |

(1) after 20 hours annealing at 220° C.
(2) after being kept at a temperature of 220° C. for 1 hour followed by tempering.

The mechanical properties of the ternary alloys in accordance with the invention are improved by keeping the alloy at 220° C. for an hour, followed by tempering.

Similar or even slightly better results can be obtained by tempering after chill hardening, this being a more economic method.

The ternary alloys do not age more quickly because of the magnesium content. The same is true of tempering after chill hardening and of treatment consisting in keeping the alloy at a temperature of 220° C. for an hour followed by tempering.

By way of example, the sole FIGURE shows the variation of the hardness of a lead alloy containing 0.15% by weight Mg and 1.8% by weight Sb at 25° C. as a function of time.

The hardness B in MPa is plotted along the Y axis and the logarithm of time, log t, in days is plotted along the X axis.

Generally speaking, the best mechanical properties are obtained after ten days or so. The alloy stabilizes after 30 to 60 days.

Of course the invention also relates to electrode supports constituted by the above-defined alloys, electrodes having such supports and lead storage cells provided with such electrodes.

We claim:

1. In a lead-acid storage cell, an electrode support comprising a lead based alloy consisting essentially of between 0.05% and 4% antimony, between 0.02% and 0.3% magnesium, between 0% and 0.3% tin, between 0% and 5% arsenic, between 0% and 0.075% copper, between 0% and 0.006% sulfur, and the balance of said alloy being lead, further characterized in that said alloy contains no barium.

2. An electrode support according to claim 1, characterized in that said alloy consists essentially of about 1.8% antimony and 0.15% magnesium, and the balance of said alloy is lead.

3. An electrode support for a lead storage cell, the support comprising a lead based alloy consisting essentially of between 0.05% and 4% antimony, between 0.02% and 0.3% magnesium, between 0.5% and 0.3% tin, and the balance of said alloy being lead, further characterized in that said alloy contains no barium.

4. An electrode support for a lead storage cell, the support comprising a lead based alloy consisting essentially of between 0.05% and 4% antimony, between 0.02% and 0.3% magnesium, between 0.05% and 5% arsenic, and the balance of said alloy being lead, further characterized in that said alloy contains no barium.

5. An electrode support for a lead storage cell, the support comprising a lead based alloy consisting essentially of between 0.05% and 4% antimony, between 0.02% and 0.3% magnesium, about 0.075% copper, and the balance of said alloy being lead, further characterized in that said alloy contains no barium.

6. An electrode support for a lead storage cell, the support comprising a lead based alloy consisting essentially of between 0.05% and 4% antimony, between 0.02% and 0.3% magnesium, about 0.006% sulfur, and the balance of said alloy being lead, further characterized in that said alloy contains no barium.

7. An electrode for a lead storage cell, the electrode having an electrode support comprising a lead based alloy consisting essentially of between 0.05% and 4% antimony, between 0.02% and 0.3% magnesium, between 0% and 0.3% tin, between 0% and 5% arsenic, between 0% and 0.075% copper, between 0% and 0.006% sulfur, and the balance of said alloy being lead, further characterized in that the alloy contains no barium.

8. A lead storage cell having electrodes with electrode supports comprising a lead based alloy consisting essentially of between 0.05% and 4% antimony, between 0.02% and 0.3% magnesium, between 0% and 0.3% tin, between 0% and 5% arsenic, between 0% and 0.075% copper, between 0% and 0.006% sulfur, and the balance of said alloy being lead.

9. A method of manufacturing an electrode support for a lead storage cell, the support comprising a lead based alloy consisting essentially of between 0.05% and 4% antimony, between 0.02% and 0.3% magnesium, between 0% and 0.3% tin, between 0% and 5% arsenic, between 0% and 0.075% copper, between 0% and 0.006% sulfur, and the balance of said alloy being lead, wherein the method comprises:
   mixing lead-antimony alloy and pure magnesium in the liquid state in a first step to form a mother alloy containing 1% by weight of magnesium and then
   melting aliquot quantities of said mother alloy and lead-antimony alloy in a second step to obtain the final alloy.

* * * * *

UNITED STATES PATENT AND TRADEMARK OFFICE
CERTIFICATE OF CORRECTION

PATENT NO. : 4,525,327
DATED : 25 June 1985
INVENTOR(S) : Roland BARDIN et al.

It is certified that error appears in the above-identified patent and that said Letters Patent is hereby corrected as shown below:

Column 1, line 39: change "include" to --included--.

Column 2, line 50: change "braking" to --breaking--.

Abstract, line 4: after "antimony" insert --,--.

Signed and Sealed this

Twenty-fourth Day of December 1985

[SEAL]

Attest:

DONALD J. QUIGG

Attesting Officer   Commissioner of Patents and Trademarks